United States Patent [19]

Marchionni et al.

[11] Patent Number: 5,026,786
[45] Date of Patent: Jun. 25, 1991

[54] PERFLUOROPOLYETHERS HAVING BROMINATED END GROUPS AND FLUOROELASTOMERS OBTAINED THEREFROM

[75] Inventors: Giuseppe Marchionni, Milan; Gian T. Viola, Cervia; Giulio Tommasi; Raffaele Ferro, both of Milan; Gianna Cirillo, Genova, all of Italy

[73] Assignees: Ausimont S.p.A.; Montedison S.p.A., both of Milan, Italy

[21] Appl. No.: 251,356

[22] Filed: Sep. 30, 1988

Related U.S. Application Data

[63] Continuation of Ser. No. 832,735, Feb. 25, 1988, abandoned, and a continuation-in-part of Ser. No. 917,550, Oct. 10, 1988, abandoned.

[51] Int. Cl.$^5$ ............................................. G08F 8/22
[52] U.S. Cl. ................................. 525/356; 525/326.4; 568/677
[58] Field of Search ......................... 568/677; 525/356

[56] References Cited

U.S. PATENT DOCUMENTS 4,500,739  2/1985  Caporiccio et al. ............... 568/677

Primary Examiner—Bernard Lipman
Attorney, Agent, or Firm—Stevens, Davis, Miller & Mosher

[57] ABSTRACT

New perfluoropolyethers comprising repeating units chosen from among

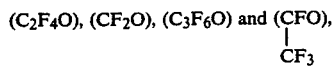

statistically distributed along the chain, having a controlled molecular weight and brominated end groups, prepared starting from the product of the photochemical oxidation of $C_2F_4$, and/or $C_3F_6$, containing peroxidic oxygen, and subsequent treatment in liquid phase with bromine, at temperatures ranging from $-40$ to $130°$ C. with the presence of ultraviolet radiations, said new perfluoropolyethers derivatives being useful as additives in rubber mixes vulcanizable with peroxides, in amounts of 0.01 to 5 parts by w per 100 parts by weight of elastomer, optionally in combination with non brominated perfluoropolyethers to improve the processability in the extrusion and the detachability of the vulcanized articles from the molding.

5 Claims, No Drawings

PERFLUOROPOLYETHERS HAVING BROMINATED END GROUPS AND FLUOROELASTOMERS OBTAINED THEREFROM

BACKGROUND OF THE INVENTION

This is a combination of prior application Ser. No. 832,735 filed Feb. 25, 1988, now abandoned, by Giuseppe Marchionni and Gian Tommaso Viola and application Ser. No. 917,550 filed Oct. 10, 1986, now abandoned, by Giulio Tommasi, Raffaele Ferro and Gianna Cirillo.

This invention relates to new perfluoropolyethers having a Br atom bound to one or both the end groups of the chain.

More in particular this invention relates to new mono- or bifunctional perfluoropolyethers having a controlled molecular weight and consisting of units chosen from amongst

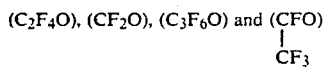

statistically distributed along the perfluoropolyether chain.

A further object of the present invention is that of providing a process for preparing the abovesaid perfluoropolyethers with brominated end groups and having a controlled molecular weight by a method which is easily practicable on a commercial scale and is capable of providing high yields of brominated product.

It is known that the reaction of oxygen with tetrafluoroethylene and/or perfluoropropene, carried out at a low temperature in the presence of UV radiations and in an inert solution, generally a fully fluorinated compound or a chlorofluorinated compound, leads to a perfluoroether product having a peroxide oxygen content which varies as a function of the operative conditions under which the photooxidation has been effected.

The process and the peroxidic products are disclosed for example in British Patent Nos. 1,26,566 and 1,104,482.

The thermal decomposition of the peroxide, which is carried out to remove peroxide bridges containing neutral end groups of the type —CF$_3$, CF$_2$CF$_3$ and acylic end groups of the type —OCF$_2$COF.

Actually, the thermal decomposition reaction of the peroxide product for providing the neutral perfluoropolyether gives rise to radicals of the type Rf0.CF2 (Rf being a perfluoroether chain), which react with one another, thus leading always to perfluoropolyethers having a high and non-controlled molecular weight.

The decomposition of the peroxidized precursors is usually carried out by a heat treatment carried out in a wide temperature range, generally from about 100° C. up to high temperatures, preferably from 180° to 250° C.

DETAILED DESCRIPTION OF THE INVENTION

It has now surprisingly been found that it is possible to prepare new mono- or bifunctional perfluoropolyethers with brominated end groups and a controlled molecular weight and with high yields if the treatment of the peroxidized precursor, having a proper peroxide oxygen content as a function of the desired molecular weight of the final product, is conducted under suitable conditions.

The new perfluoropolyethers with brominated end groups according to the invention have the general formula:

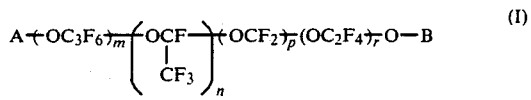

wherein m, n, p and r are integers from 0 to 50, m+n+p+r being at least 2, and wherein A and B, equal or different between them, are end groups chosen from the class:

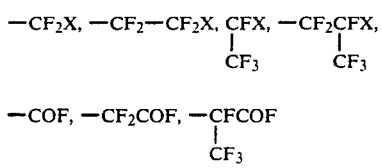

wherein X is Br or F, and at least one of the groups A and B contains a bromine atom.

The perfluoro-oxyalkylene units of general formula (I) are statistically distributed along the perfluoropolyether chain.

The process according to the invention for preparing mono- or bifunctional perfluoropolyethers with high yields consists in subjecting a peroxidized perfluoropolyether, obtained from the photooxidation of tetrafluoroethylene and/or perfluoropropene, having a predetermined peroxide oxygen content, to photolysis with UV radiations, in liquid phase, in the presence of bromine at temperatures ranging from −40 to 130° C., either or not in the presence of a completely fluorinated or chlorofluorinated inert solvent, the liquid reaction medium being fully saturated with bromine.

The product: resulting from the photooxidation, which contains peroxide bridges, can be utilized as such if the peroxide oxygen content is already at the value suitable for obtaining the desired molecular weight of the final brominated perfluoropolyether.

Should the peroxidized precursor have a higher peroxide oxygen content than desired, then it is subjected to thermal treatments according to conventional techniques, such as the ones described in the above-mentioned British patent.

The term peroxide oxygen content (P.O.) means the amount in grams of activated oxygen referred to 100 grams of perfluoropolyether.

The average molecular weight of the brominated perfluoropolyether is directly related to the peroxide oxygen content of the starting perfluoropolyether.

In fact in correspondence of the peroxidic bridges, during the bromination according the invention, occurs a cleavage of the perfluoropolyether chain: consequently the reduction of the average molecular weight is proportional to the peroxidic bridges in the chain.

The solvent utilized in the bromination reaction is any fully fluorinated or, as an alternative, chlorofluorinated compound, which is inert in the reaction conditions and does not contain unsaturations.

As solvents useful to the purpose there may be cited, for example, the perfluorocarbon or the fluorocarbons.

To prepare bromine-saturated solutions it is generally operated having the bromine present as a bottom body in the reaction apparatus.

The preferred reaction temperature is in the range of from 60° to 120° C., more preferably from 90° to 110° C.

In fact, by operating under the above-cited conditions it is possible to obtain very high yields of brominated perfluoropolyethers; therefore it could be assumed that the radicals, which form from the peroxide decomposition, completely react with bromine, providing only end groups of type —$CF_2Br$, or —CFBr.

$$-\underset{CF_3}{\underset{|}{CFBr.}}$$

If there is only one peroxidic bridge in the starting perfluoropolyether chain, the obtained products shall be prevailing by monobrominated compound. If there are many peroxidic bridges in the starting perfluoropolyether chain, the obtained products shall be prevailing formed by dibrominated compounds.

If it is operated at higher temperatures than 130° C., the perfluoropolyethers according to the invention are still obtained, however, they contain only very low percentages of brominated in particular of dibrominated perfluoropolyethers.

By the process of the present invention it is possible to prepare both high molecular weight perfluorobrominated compounds, depending on the peroxide oxygen content of the starting precursor, or by acting on the temperature at which the photolysis of the initial peroxide is carried out.

In fact, the high molecular weights are obtainable by operating at temperatures from −40° to 80° C., while low molecular weight brominated perfluoropolyethers are obtainable in a temperature range of from 80° to 130° C.

The brominated products according to the invention can be obtained also by carrying out the bromination in the high case however the yield of brominated perfluoropolyether is very low and such a process could not have any interest from a technical point of view.

Furthemore it has been found that by the simple heat treatment it is not possible to obtain perfluoropolyethers with a controlled molecular weight depending on the peroxide content of the starting perfluoropolyether.

The process indicated hereinbefore permits to overcome all the abovesaid drawbacks. In fact the new brominated perfluoropolyethers of the invention are obtained by an utmostly simplified process, with very high yields and with a molecular weight regulated as a function of the peroxide content of the starting peroxidized perfluoropolyether. A further purpose of the present invention is to provide rubbers which are vulcanizable by peroxides and exhibit improved processability properties such as a better extrudability and a better detachability of the vulcanized article from the molding dies utilized in injection molding or compression molding technologies.

The invention is based on the use of additives of the class of perfluoropolyethers and derivatives thereof having brominated end groups comprising the following formulas:

$$A-(O-C_3F_6)_m-(OCF)_n-(OCF\ CF_2)_q-O-B \quad (I)$$
$$\phantom{A-(O-C_3F_6)_m-(OCF)_n-(OCF\ CF_2)_q}|$$
$$\phantom{A-(O-C_3F_6)_m-(OCF)_n-(OCF\ CF_2)_q}T$$

in which: T=F or $CF_3$; m, n and q are integers, zero included, m+n+q ranges from 2 to 200; m/(n+q) is 50 when n and/or q are different from zero; when m=0, q/n is ≧0.2 and ≦20 when n is other than zero; A and B, either like each other or different from 1 to 50 when n is from each other, are selected from the 9roups —$CF_2X$, —$CF_2$—$CF_2$—X, $$-\underset{CF_3}{\underset{|}{CF-X,}}$$

—$CF_2$—$CFX$—$CF_3$, —COF, —$F_2$ COF, and $$-\underset{CF_3}{\underset{|}{CF-COF,}}$$

X being bromine or fluorine; when m is different from zero, X can be bromine only in A or in B.

Particularly suitable are the liquid products with a mean molecular weight ranging from 500 to 10,000, the preferred being those which contain at least one bromine atom in at least one of the end groups A and B.

Perfluoropolyethers of formula:

$$F-(CF_2CF_2CF_2-O)_n-CF_2CF_3 \quad (II)$$

where n is an integer greater than 2 and lower than 200, prepared according to the method described in European patent No. 148,482, may also be used.

It is possible also to use mixture of neutral compounds of formula (1) and/or formula (11) with the brominated compounds of formula (1). For neutral compounds it is intended a perfluoropolyether having terminal groups without bromine.

Products which are suited as additives according to the invention and comprised in formula (1) are the perfluoropolyethers prepared by photochemical oxidation of $C_2F_4$ or $C_3F_6$, commercially known as Flombin ®Z and Flombin ®Y and the perfluoropolyethers of the class of the polymers derived from perfluoropropene-epoxide, commercially known as Krytox ®. It is possible to utilize also perfluoropolyethers prepared by photochemical oxidation of $C_2F_4$ or $C_3F_6$.

Particularly suitable have proved to be brominated perfluoropolyether derivatives prepared according to the process described in Italian patent applications No. 19,653 A/85 and No. 22517 A/85, and obtained as mixture of products at different degrees of bromination.

The additives according to the present invention are dispersed by mixing in rubbers vulcanizable by of peroxides or by mixed peroxy and ionic vulcanizing systems or in mixture thereof, to improve their processability.

As is well known, vulcanizing systems based on peroxides are capable of vulcanizing many types of rubbers, imparting to the vulcanized articles good properties with respect to stability to heat, to chemical agents, and to mechanical stresses.

The rubber mixes vulcanizable with peroxides, per se known in the art, generally consist of the following components:

RUBBER

As types of elastomers vulcanizable with peroxides there may be cited: natural rubber, ethylene/propylene/diene copolymers, butadiene/styrene rubbers, butadiene/acrylonitrile rubbers, silicone rubbers, fluoroelastomers containing peroxy vulcanization sites, mixtures of rubbers of which at least one is vulcanizable with peroxides or with mixed vulcanization systems, and in particular mixtures of a fluoroelastomer based on $CH_2=CF_2$ and of an elastomeric polymer $C_2F_4/C_3H_6$, of the type of AFLAS®.

PEROXY STARTER (vulcanizing agent)

This consists of an organic peroxide, such as for example: benzoylperoxide, dicumyl peroxide, 2,5-dimethyl-2,5-di-(t.butylperoxy)-hexane, $\alpha,\alpha$, -bis(t.butylperoxy)diisopropykbenzene, aliphatic or cyclic bis-peroxycarbonates.

VULCANIZING COAGENT

This consists of an unsaturated di- or tri-functional compound such as e.g., triallylcyanurate, triallylisocyanurate, divinylbenzene, m-phenylene-bis(-maleimide).

REINFORCING FILLERS

Carbon black, silica, etc.

ACID ACCEPTORS

Such as e.g. the oxides of lead, zinc, calcium, magnesium.

PROCESSING COADJUVANTS

These coadjuvants are products endowed with plasticizing or lubricating properties, such as e.g., vegetable waxes, low molecular weight polyethylenes, various stearates, polyesters, octadecylamines, and the like.

The use of such coadjuvants becomes necessary owing to the poor extrudability characteristics of the mixtures and to the phenomena of adhesion to the dies and soiling of them.

The conventional processing coadjuvants give rise, in a few cases, to problems of interference with the peroxy vulcanization system, and of a non-satisfactory appearance of the surface of the molded piece. Furthermore, in the specific case of the fluoroelastomers, a "thermal stabilization" (postvulcanization) at temperatures of from 200° to 250° C. for a time ranging from 10 to 30 hours is absolutely necessary to impart to the fluoroelastomers the desired properties of stability with respect to heat, to chemical agents, and to solvents. During this operation, the common plasticizing agents (glycols, stearates, organic phosphates, oleates, phthalates etc.) volatilize and/or decompose.

This causes a remarkable degradation of the mechanical properties of the final article, in particular:
an excessive increase in hardness;
a decay of the stability to compression set;
a decay of the elastic characteristics (low elongation value and high modulus value);
a low thermal stability which precludes the use thereof in severe applicative conditions (180° C.).

In conclusion, the advantages achievable during the processing result in unacceptable shortcomings in the final article.

Thus, the use of plasticizing or lubricating agents is limited to small amounts (1-3p.h.r.), i.e., parts per hour of rubber, which do not sensibly alter the fina properties of the vulcanized article, but, on the hand, are insufficient to meet the aforesaid requirements.

In particular, it has been ascertained that the utilization of perfluorosilicone oils permits the hardness to be lowered by 4–5 points, but exhibits however some difficulties as regards the admixing to and the incorporation into the fluoroelastomer. Furthermore, a reduction in the vulcanization rate and a worsening of the compression set value and thermal stability value can be observed.

The use of fluorinated polymers having a very low molecular weight and the consistency of waxes, such as Viton LM produced by Du Pont, was adopted to impart better rheological characteristics to the mixtures, and in particular during extrusion. In this way it is possible to obtain manufactured articles of large size and with complicated profiles. However, the use of such a "plasticizer" in amounts of 10–20 parts by weight for 100 parts of fluoroelastomer is possible only with conventional vulcanizing systems, while it is not consistent with vulcanizing systems based on peroxides. The result thereof is a worsening of the stability with respect to heat, to chemical agents, to solvents and oils, and of the compression set value.

Surprisingly, by using the additives according to the present invention in amounts below 1 part by weight when the additive is neutral, and ranging from 0.01 to 5 parts by weight per 100 parts of rubber when the additive is brominated, and preferably up to 3 parts by weight in the case of additives having a mean aolecular weight equal to or higher than 2,500, and up to 1.5 parts by weight in the case of additives having a mean molecular weight below 2,500, mixes were obtained—the other formulation elements remaining the same (rubber, starter, crosslinking co-agent, acidity acceptors)—exhibited a better behavior as regards both processability by extrusion and the detaching of the vulcanized article fror the dies.

The use of high molecular weight additives improves in particular the processability in terms of yield and appearance of the extrudate, while the lower molecular weight additives more easily rigrate to the surface, thus imparting in particular an excellent detachability of the vulcanized article from the molding die. For this reason, the amount of these low molecular weight additives are to be limited to prevent greasiness phenomena or, in the case of a hi9h bromine functionality, a sensible interference with the vulcanization process.

In fact, if it is operated with the proper amounts of additives according to this invention, these additives do not sensibly interfere with the vulcanizing system: actually, vulcanization tests carried out according to standard ASTM D 2084 with an oscillating-disc rheometer (Monsanto), did not show significant differences with regard either to the rate or the vulcanization yield. Conversely there was oserved a lowering of the minimum torque, which means a better processability of the mixture.

Furthermore, the bromine-containing additive chemically binds to the elastomeric chain during the vulcanization process.

In fact, if the mixture containing the additive is subjected to extraction tests with $CFCl_2-CF_2Cl$ as solvent, the additive is recovered in the extraction liquid. Conversely, if the additive-containing mixture is vulcanized, a subsequent extraction with the same solvent does not lead to the recovery in the liquid of the additive.

This, in practice, leads to a further improvement: actually, the final article retains in the long run an excellent surface appearance and does not exhibit greasiness phenomena.

The use of the additives according to the present invention turns out to be particularly suitable for the fluoroelastomers in general, such as for example the copolymers of $CH_2=CF_2$ with $C_3F_6$ or with $C_3F_6+C_2F_4$ and containing peroxy crosslinking sites, the copolymers of $C_2F_4$ with propylene or with perfluoroalkyl-perfluorovinyl ethers (in particular methylvinyl-ether) containing, in the latter case, a cure site monomer, terpolymes of $C_3F_6$, vinylidene fluoride and perfluoroalkyl-perfluorovinyl-ether (in particular methylvinylether) containing a cure site monomer.

The following examples are given merely to illustrate the present invention, without limiting, however, the scope and applicative modalities thereof.

A - PREPARATION OF BROMULATED PERFLUOROPOLYETHERS

EXAMPLE 1

Into a cylindrical photochemical reactor having a maximum capacity of 300 ml, with an optical path of 0.5 cm, equipped with a coaxial quartz sheath for housing a mercury vapor lamp type Hanau TQ 150 or a noble gas discharge lamp, for example a Xenon lamp type PEK INC. X-75, equipped with a magnetic stirrer, a reflux dropping device, a $CO_2$ trap and a oregulation system for both the reactor and the sheath system, there were introduced 430 of perfluoropolyether obtained from tetrafluoroethylene having a peroxidic oxygen (P.O.) content of 1(1.04% by weight, a viscosity of 9,500 cSt (at 20° C.), an average molecular weight of 39,930 and a m/n ratio, determined through NMR ($^{19}$F) analysis, equal to 0.8. 5 ml of bromine were added, the whole was mixed and the temperature was brought to about 100° C. Subsequently, after switching on of the lamp, 20 ml of bromine were added during the test, which lasted hours. At the conclusion of the test, the reaction mass was discharged into a flask and bromine was distilled under vacuum.

Obtained were 390 g of a product having a viscosity of cSt and practically free from P.O., and having average molecular weight (PM) of 3550, such product exhibiting, on NMR ($^{19}$F) analysis, the following structure:

$BrF_2C-O(C_2F_4O)_m(CF_2O)-CF_2Br$ with a m/n ratio=0.8, analogous with the one of the starting product.

The chemical shifts of the brominated end groups ($\epsilon$, ppm; $CFCl_3$) were, respectively:

| | |
|---|---|
| —$OCF_2OCF_2Br$ | −19.9 ppm |
| —$OCF_2CF_2OCF_2Br$ | −18.4 ppm |

The product yield in brominated products was equal to 96% with respect to 4% of neutral product of formula:

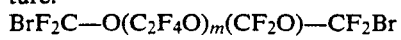

where R and R', equal or different from each other, may be —$CF_2$ and —$CF_2CF_3$.

Example 2

Into the photochemical reactor of example 1 there were introduced 125.3 g of perfluoropolyether obtained from tetrafluoroethylene having a P.O. of 1.04% by weight and a viscosity of 9500 cSt, along with 280 g of the throughly fluorinated solvent 1,2-perfluorodimethyl cyclobutane.

After mixing of the mass, 2 ml of bromine were added and the temperature was brought to 0° C.

Subsequently, after switching on of the lamp, further 6 ml of bromine were added during the test which lasted 20 hours. At the conclusion of the test the reaction mass was discharged into a flask and the bromine as well as the solvent were distilled ander vacuum.

Obtained were 109 g of product having a viscosity of 32 cSt and being practically free from P.O., having PM of 4630, such product exhibiting, on NMR ($^{19}$F) analysis, the same structur the dibrominated product of example 1.

Example 3

Into a 200-cc flask equipped with a stirrer, a thermometer, a cooler and a dropping device, 100 g of perfluoropolyether obtained from tetrafluoroethylene, having a P.O. equal to 1.2% by weight, viscosity of 5300 and PM of 31,300 introduced. The reactor temperature was brought to 150° C. and 8 ml of bromine were added at regular intervals during 5 hours; subsequently the temperature was brought to 210° C. and the mixture was refluxed during additional 5 hours. At the end of the test, bromine was removed under vacuum, so obtaining 79 g of a product having a viscosity of 17 cSt, and PM of 4,300 which, on NMR ($^{19}$F) analysis, revealed to have practically the same structure as the dibrominated product obtained in example 1, but with a yield equal to 5% with respect to 95% of completely fluorinated neutral product.

Example 4

120 g of perfluoropolyether of example 3 obtained from tetrafluoroethylene, having a P.O. equal to 1.2% by weight, were introduced into the flask of example 3. The reactor temperature was brought to 150° C. and 8 ml of Br were added during the 5-hour test; subsequently the temperature was raised to 180° C. and the whole was allowed to react during additional 5 hours. At the conclusion of the test, bromine was removed under vacuum and 93 g of a product having a viscosity of 21 cSt were obtained; such product, subjected to NMR ($^{19}$F) analysis, proved to have practically the same structure as the dibrominated product obtained in example 1, but with a yield equal to 4.5% with respect to 95.5% of completely fluorinated neutral product.

Example 5

420 g of perfluoropolyether obtained from tetrafluoroethylene with a P.O. of 1.5% by weight, a viscosity of 14400 cSt and a molecular weight of 46,200 were introduced into a photochemical reactor similar to the one described in example 1.

After switching on of the lamp and maintaining a temperature of 100°, 25 ml of bromine were added during 18 hours. At the conclusion of the test there were obtained 345 g of a product having a viscosity of 7 cSt and PM of 21,600 with a yield of dibrominated product equal to 96.5% besides 3.5% of neutral product.

Example 6

Under the same conditions of example 5 and using the same perfluoropolyether, but at a temperature of 60° C., there were obtained 350 g of a product having a viscosity of 45 cSt and an average molecular weight of 5,250.

The % amount of dibrominated product was higher than 85%.

Example 7

Under the same conditions and using the same perfluoropolyether of example 5, but operating at a temperature of 120° C. there were obtained 330 g of a perfluoropolyether with a viscosity of 10 cSt and a molecular weight of 3,000; in this case the dibrominated product amount was equal to 74%.

Example 8

A peroxide perfluoropolyether obtained by photochemical oxidation of tetrafluoroethylene, having a mean molecular weight of 24,500 and a peroxide content equal to 0.9% by weight, was reduced by a thermal treatment at a temperature of 160° C. during 5 hours until obtaining a product having an average molecular weight of 18000 and a peroxide oxygen content equal to 0.35% by weight.

400 g of such product were places into a photochemical reactor similar to the one described in example 1 and were irradiated in the presence of Br$_2$(7 ml) during 10 hours at a temperature of 100° C.

After removal of Br under vacuum, there were obtained 380 g of a product having a viscosity of 65 cSt and a content of products with brominated functionalities equal to 95% by weight.

Example 9

Into the photochemical reactor of example 1 there were introduced g 400 of perfluoropolyether obtained from C$_3$F$_6$, having a peroxidic oxygen content (P.O.) of 0.7% by wt and a molecular weight 2,550 (osmometric measure).

Subsequently 10 g bromine are added and the temperature is raised to 100° C. After switching on the lamp further bromine was added during the test (20 g during 15 hours). At the end of the test the reaction mass was discharged into a flask and residual bromine was distilled under vacuum.

The obtained product (395 g) showed an average molecular weight of 1,220, was practically free from P.O. and contained brominated and groups

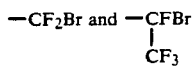

in amount equal amount equal to a brominated end group for each perfluoropolyether chain, the other end group being of the type:

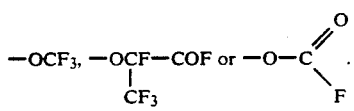

Example 10

Into a photochemical reactor having capacity of 1,000 ml and on optical path of 2 cm equipped with coaxial quart sheats for housing a mercury vapor lamp type Marian TQ 150, with traps and thermoregulation system suitable for maintaining the temperature at −40° C., were introduced 1000 g of perfluoropropene. After switching on the lamp, a mixture O$_2$+C$_2$F$_4$ in molar ratio 5:1 was fed the total amount of gases being fed at a rate of 192 l/h (measured at atmospheric pressure). After 150' the lamp was switched off and 380 g of a perfluoropolyether having P.O. equal to 3.23% and viscosity of 1064 cSt (20° C.). From the NMR analysis it came out that the structure consists of C$_3$F$_6$O units randomly alternated with CF$_2$CF$_2$O and CF$_2$O units and of peroxidic units.

The reduction of the peroxidic oxygen content was obtained by subjecting the product to the irradiation of a U.V. lamp in the reactor used in example 1 and maintaining the temperature at 0° C.

After 18 hours the P.O. content was 1.1% and the molecular weight of the product was 2,1780.

In the same reactor was carried out the bromination reaction at 100° C., by introducing 10 g bromine at the beginning and then further 40 g during the following 30 hours. Peroxidic oxygen was completely eliminated.

After removal of excess bromine, 340 g of perfluoropolyether were obtained, of average molecular weight 1050, having brominated end groups

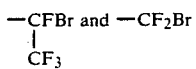

near neutral end groups of the type —OCF$_3$ and acid end group of the type

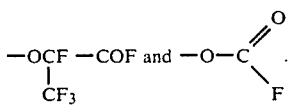

The functionality of the product, expressed as ratio between brominated end groups and number of perfluoropolyether chains is 1.3.

B - USE AS ADDITIVES FOR FLUOROELASTOMERS.

Examples 11–20

By the usual mixing techniques there were prepared rubber mixtures comprising the ingredients indicated in Table. With the mixes si prepared, the tests and determinations indicated in said Table 1 were carried out.

Ingredients used in the mixture

Elastomer 1: CH$_2$=CF$_2$/C$_3$F$_6$/C$_2$F$_4$ terpolymer in the molar ratio 2/1/1 containing as a cure site monomer a brominated olefin, having a Mooney viscosity ML (1+4) at 100° C. =104 and a total bromine content of 3,500 ppm VITON ®F).

Elastomer 2: CH$_2$=CF$_2$/C$_3$F$_6$ copolymer in a molar ratio 3.5/1 and containing as a cure site monomer a brominated olefin, having a Mooney viscosity ML (1+4) at 100° C.=109 and a total bromine content of 2,000 ppm (FLUOREL ®2480).

Elastomer 3: C$_2$F$_4$/C$_3$H$_6$ copolymer in a molar rat.io 1/1, having a Moneey viscosity ML 1+4 at 100° C. =130 (AFLAS ®). Luperco ® 101 XL=2,5-dimethyl-2,5-di(terbutylperoxy--hexane: product at 45% by weight, with 55% of inert filler.

TAIC: triallylisocyanurate.

Black MT: carbon black for rubbers (ASTM N 990)

Additive 1: Perfluoropolyether from hexafluoropropene, brominated at the end group, containing on the average about 1 bromine atom per molecule (functionality: about 1), having a viscosity of 30 cSt at 20° C. and a molecular weight of about 1,220.

Additive 1 was prepared as follows: into a cylindrical photochemical reactor having an optical path of 0.5 cm, equipped with a coaxial quartz sheath for housing a mercury vapor lamp, type Hanau TQ150) or a noble gas (for example Xenon) discharge lamp, type PEK, INC X 75, equipped with a magnetic stirrer, a reflux condenser, a $CO_2$ trap, and a thermoregulation system for both the reactor and the sheath system, there were charged 400 g of perfluoropolyether from $C_3F_6$ having an activated oxygen content equal to 0.75% by weight, and a molecular weight, osmometrically determined, equal to 2,550 u.m.a., i.e., atomic mass units.

10 g of bromine were added and the temperature was brought to 100° C. Subsequently, after lighting of the lamp there were added 20 g of bromine during the test, which lasted overall 15 hours. At the end of the preparation, the reaction mass was discharged into a flask and the residual bromine was distilled under vacuum.

Obtained were 395 g of a product having a mean molecular weight equal to 1,220 u.m.a., practically no oxidation power, and having brominated end groups of the type $OCF_2Br$ and

in the ratio of one brominated end group for each perfluopolyether chain, the other end group beinq composed of trifluoromethyl units —O—$CF_3$ or acyl fluorides

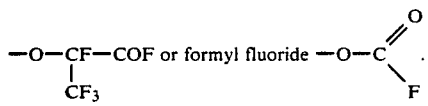

Additive 2: Perfluoropolyether from brominated tetrafluoroethylene with a functionality degree in bromine of about 1.8, having a viscosity of 29.8 cSt at 20° C. and a molecular weight of about 4,500.

Additive 2 was prepared as follows: into a cylindrical photochemical reactor having a capacity of 300 cc, with an optical path of 0.5 cm, equipped with a coaxial quartz sheath for housing a mercury vapor lamp, type hanau TQ 150 or a noble gas discharge lamp, for example Xenon, of type PEK, INC X 75, equipped with a magnetic stirrer, a reflux dropping funnel, a $CO_2$ trap, ans a thermoregulation system both for the reactor and for the sheath system, there were charged 420 g of perfluoropolyether from tetrafluoroethylene having a peroxy oxygen content (P.O.) of 1.1% by weight, a viscosity of 10,800 cSt (at 20° C.) and an m/n ratio, determined by NMR analysis (19F), equal to 0.95. After addition of 5 ml of $Br_2$, the whole was mixed and the temperature was brought to 110° C. and maintained at this value for 16 hours, in the course of which a further 25 ml of bromine were added. At the end of the reaction, after removal of the bromine there were obtained 397 g of a product having a viscosity of 29.8 cSt (at 0° C.) and a molecular weight, osmometrically determined, equal to 1 8.

Additive 3: perfluopropolyether from neutral tetrafluorethylene having a viscosity of 30 cSt.

The Tests Performed Detachability test: the mixture was vulcanized in a press at 170° C. for 15 minutes, the test piece was then removed from the mold at 170° C. and the detachability was immediately evaluated on the basis of the percentage of breaks and/or of residue of vulcanized product, if any, adhering to the mold. In Table 1 the detachability is indicated by:

S (low) if, out of 4 test pieces, all test pieces break and/or leave residues of vulcanized product on the mold: or 1 test piece at the most detaches without breaking and/or leaving residues of vulcanized product on the mold;

D (fairly good) if, out of 4 test pieces, 2 or 3 test pieces detach without breaking and/or leaving residues of vulcanized product adhering to the mold;

B (good) if, out of 4 test pieces, all test pieces detach without breaking and/or leaving vulcanized residues adhering to the mold.

Processability test in extruder: the processability was evaluated according to method ASTM D2230/78, which classifies the extrudates both as the extrudate amount in grams per minute (Method B) and as the surface appearance of the Garvey rating (Method A - System B).

Characteristics of the vulcanized test obtained: the characteristics were determined on test pieces obtained by vulcanization in an oven at 250° C. for 16 hours, the postvulcanization being preceded by a temperature rise from 100° C. to 250° C. in 8 hours.

In Table 1, examples 1, 7 and 9 are comparative examples, namely: example 1 is to be compared with example 8; example 9 is to be compared with example 10.

From the comparision between the examples of the invention with the additive and those without additive with regard to the thermal stability characteristics, it is not possible to recognize a sure effect of the additive according to the invention, as the variations occurring upon variation of the additive fall within the variability of the measuring method.

TABLE 1

| EXAMPLE | 11 | 12 | 13 | 14 | 15 | 16 | 17 | 18 | 19 | 20 |
|---|---|---|---|---|---|---|---|---|---|---|
| ELASTOMER 1 (b. weight) | 100 | 100 | 100 | 100 | 100 | 100 | — | — | — | — |
| ELASTOMER 2 (b. weight) | — | — | — | — | — | — | 100 | 100 | — | — |
| ELASTOMER 3 (b. weight) | — | — | — | — | — | — | — | — | 100 | 100 |
| LUPERCO 101% $L^R$ (b. weight) | 3 | 3 | 3 | 3 | 3 | 3 | 3 | 3 | 3 | 3 |
| TA10 (b. weight) | 3 | 3 | 3 | 3 | 3 | 3 | 3 | 3 | 3 | 3 |
| P60 (b. weight) | 3 | 3 | 3 | 3 | 3 | 3 | 3 | 3 | 3 | 3 |
| BLACK MT (b. weight) | 30 | 30 | 30 | 30 | 30 | 30 | 30 | 30 | 30 | 30 |

TABLE 1-continued

| EXAMPLE | 11 | 12 | 13 | 14 | 15 | 16 | 17 | 18 | 19 | 20 |
|---|---|---|---|---|---|---|---|---|---|---|
| ADDITIV 1 (b. weight) | — | 0.5 | — | 1.5 | 3 | — | — | 3 | — | — |
| ADDITIV 2 (b. weight) | — | — | — | — | — | 3 | — | — | — | 3 |
| ADDITIV 3 (b. weight) | — | — | 0.5 | — | — | — | — | — | — | — |
| THERMO-MECHANICAL CHARACTERISTICS ODR at 180° C. (1) | | | | | | | | | | |
| Min. torque (inch · lbs) | 22 | 22 | 22 | 21 | 20 | 20 | 25 | 24 | 17 | 16 |
| ts. 10 (sec.) | 79 | 81 | 70 | 81 | 84 | 80 | 84 | 87 | 109 | 111 |
| ts. 50 (sec.) | 114 | 120 | 115 | 123 | 132 | 123 | 117 | 133 | 211 | 295 |
| Max. torque (inch · lbs) | 115 | 108 | 109 | 105 | 98 | 97 | 112 | 98 | 75 | 68 |
| PROCESSABILITY (2) | | | | | | | | | | |
| yield (a) (g/min) | 32 | 32 | 32 | 39 | 45 | 49 | 44 | 47 | 26 | 35 |
| Garvey rating (b) | 6 | 8 | 8 | 9 | 10 | 10 | 9 | 11 | 8 | 8 |
| DETACHABILITY | S | D | S | D | S | D | S | D | S | D |
| VULCANIZED TEST-PIECE CHARACTERISTICS | | | | | | | | | | |
| M 100 (MPa) (modulus at 100) CR | 6.1 | 6.2 | 6.2 | 6.1 | 5.0 | 4.9 | 4.0 | 3.1 | 4.3 | 3.9 |
| (MPa) (tessile stress) | 19.4 | 21.6 | 21.5 | 20.3 | 17.0 | 17.0 | 17.0 | 14.8 | 16.6 | 16.6 |
| AD (%) (elongation at break) | 216 | 224 | 216 | 216 | 219 | 220 | 278 | 292 | 261 | 261 |
| Hardness, Shore A (points) (4) | 72 | 75 | 75 | 73 | 70 | 71 | 70 | 70 | 70 | 70 |
| COMPRESSION SET at 200° C. × 70 h (6) | | | | | | | | | | |
| O-ring (%) 25 × 3.53 (in mm) | 33 | 33 | 34 | 33 | 33 | 33 | 32 | 32 | 48 | 48 |
| CHEMICAL STABILITY IN BP Olex (MK 4409) at 150° C. for 7 days (6) | | | | | | | | | | |
| P (%) | 0.4 | 0.4 | 0.4 | 0.4 | 0.4 | 0.4 | 0.4 | 0.4 | 3.3 | 3.3 |
| V (%) | 0.8 | 0.6 | 0.8 | 0.8 | 0.8 | 0.8 | 0.8 | 0.8 | 6.0 | 6.0 |
| TERMAL STABILITY at 275° C. for 70 h (7) | | | | | | | | | | |
| CR (%) | −62 | −43 | −44 | −36 | −60 | −62 | −55 | −36 | −44 | −40 |
| AR (%) | +44 | +41 | +31 | +35 | +59 | +57 | −34 | −34 | +16 | +1 |
| Hardness (points) | −1 | −2 | −2 | −2 | −1 | −1 | −1 | −2 | −7 | −5 |

(1) ASTM D-2084
(2) ASTM D-2230-78 (a) Method B. (b) Method A - System B
(3) ASTM D-412
(4) ASTM D-2240
(5) ASTM D-395 Method B
(6) ASTM D-471
(7) ASTM D-573

We claim:

1. Process for the manufacture of perfluoropolyethers of the formula:

$$A-(OC_3F_6)_m-\left(\begin{array}{c}OCF \\ | \\ CF_3\end{array}\right)_n-(OCF_2)_p-(OC_2F_4)_r-O-B$$

wherein m, n, r and p are integers from 0 to 50, m+n+r+p being at least 2, and wherein A and B, equal to or different from each other, are end groups selected from the group consisting of:

$-CF_2X$; $-CF_2CF_2X$; $-CFX$; $-CF_2CFX$;
$\quad\quad\quad\quad\quad\quad\quad\quad\quad\quad|\quad\quad\quad\quad|$
$\quad\quad\quad\quad\quad\quad\quad\quad\quad\quad CF_3\quad\quad\quad CF_3$ $-COF$; $-CF_2COF$; and $-CFCOF$;
$\quad\quad\quad\quad\quad\quad\quad\quad\quad\quad\quad\quad\quad\quad|$
$\quad\quad\quad\quad\quad\quad\quad\quad\quad\quad\quad\quad\quad\quad CF_3$ wherein X is fluorine or bromine, at least one of the end groups A and B containing a bromine atom, the perfluoro oxyalkylene units being distributed randomly along the perfluoropolyether chain; consisting of subjecting a perfluoropolyether containing peroxidic oxygen, obtained by reacting at low temperature tetrafluoroethylene and/or hexafluoropropene with oxygen in the presence of U.V. radiations and in an inert solution, to U.V. radiations in liquid phase in the presence of bromine, at temperatures from −40° to 120° C., the liquid reaction medium being saturated with bromine.

2. The process according to claim 1, in which the treatment with bromine is carried out at a temperature from 90° to 110° C.

3. The process according to claim 1, wherein the treatment with bromine is carried out at a temperature from 0° to 80° C.

4. The process according to claim 1, wherein to obtain a final product having a controlled molecular weight, the product of the photooxidation of $C_2F_4$ and/or $C_3F_6$ is subjected to a thermal treatment to reduce the peroxide oxygen content to a value pre-established as a function of the desired molecular weight of the final product.

5. The process according to claim 1, wherein the UV-radiation photolysis of the oxidation product or $C_2F_4$ and/or $C_3F_6$ with bromine is accomplished in the presence of fully fluorinated inert solvents.

* * * * *